United States Patent [19]

Tanimura et al.

[11] 3,963,652

[45] June 15, 1976

[54] ADHESION OF RUBBER TO REINFORCING MATERIALS

[75] Inventors: Syozo Tanimura, Minoo; Yutaka Terada, Nishinomiya; Hiroshi Fukuhara, Osaka, all of Japan

[73] Assignee: Sumitomo Chemical Company, Limited, Japan

[22] Filed: Mar. 27, 1974

[21] Appl. No.: 455,126

[30] Foreign Application Priority Data

Mar. 27, 1973 Japan.............................. 48-35455

[52] U.S. Cl.................................. 260/3; 156/335; 260/14; 260/17.2; 260/19 UA; 260/54; 260/841; 260/842; 260/843; 260/845; 260/846; 428/460; 428/474; 428/480; 428/483; 428/524

[51] Int. Cl.².......................... C09J 3/14; C09J 3/16; C09L 9/00; C09L 61/12

[58] Field of Search....................... 260/3, 845, 846; 156/335

[56] References Cited
UNITED STATES PATENTS

| | | | |
|---|---|---|---|
| 3,342,238 | 9/1967 | Weinstock et al. | 260/846 |
| 3,517,722 | 6/1970 | Endter et al. | 260/846 |
| 3,660,202 | 5/1972 | Edington et al. | 260/845 |
| 3,681,168 | 8/1972 | Baker | 156/335 |
| 3,817,890 | 6/1974 | Rouzier | 260/846 |
| 3,843,484 | 10/1974 | Kamiyoshi et al. | 260/845 |

FOREIGN PATENTS OR APPLICATIONS

| | | | |
|---|---|---|---|
| 564,192 | 10/1958 | Canada | 260/845 |
| 1,050,836 | 12/1966 | United Kingdom | 260/846 |

*Primary Examiner*—John C. Bleutge
*Attorney, Agent, or Firm*—Stewart and Kolasch, Ltd.

[57] ABSTRACT

A vulcanizable rubber composition comprising a rubber component, a formaldehyde-donor and a formaldehyde-acceptor, the formaldehyde-acceptor being a co-condensate of formaldehyde with a mixture of resorcinol and a phenol other than resorcinol, or a mixture of a condensate of resorcinol with formaldehyde and a condensate of the phenol with formaldehyde, which is useful for achievement of the excellent adhesion of rubber to reinforcing materials simultaneously with vulcanization.

6 Claims, No Drawings

ADHESION OF RUBBER TO REINFORCING MATERIALS

The present invention relates to an improvement in the adhesion between rubber and reinforcing materials.

In the preparation of rubber articles such as tires, belts and hoses whose rubber is required to be reinforced with reinforcing materials, the adhesion between the rubber and the reinforcing materials often becomes a problem.

Adhesion has conventionally been carried out by pretreating reinforcing materials with certain adhesives. In recent years, however, the so-called "compounding adhesion" has attracted the attention of the industry. Thus, certain chemicals called "compounding adhesives" are incorporated into rubber on compounding of various ingredients, thereby increasing the adhesiveness between the reinforcing materials and rubber irrespective of whether the reinforcing materials are pretreated with adhesives or not.

Namely, the term compounding adhesion means a method for realizing the adhesion between rubber and reinforcing materials simultaneously with vulcanization by the use of a vulcanizable rubber composition obtained by compounding the following components into a rubber component separately or in a pre-mixture thereof: (1) the so-called "formaldehyde-acceptor" such as m-disubstituted benzenes (e.g. resorcinol, m-aminophenol) and their reaction products with aldehydes (e.g. formaldehyde, acetaldehyde) and (2) the so-called "formaldehyde-donor" which generates formaldehyde by its decomposition on vulcanization.

There are known various prior art publications about the compounding adhesion procedure, such as Japanese Pat. Publication Nos. 16421/1965, 27463/1970 and 7640/1972, and U.S. Pat. No. 2,746,898. Since these prior art techniques, however, are not always satisfactory as mentioned below, an improvement is strongly required.

When resorcinol, which is regarded as one of the most effective formaldehyde-acceptors, is used in the high temperature compounding (usually above 110°C) which is essential for uniform dispersion of the acceptor into rubber, it exhibits such a very undesirable defect that not only does the resorcinol sublime remarkably, resulting in a bad effect on environmental sanitation, but also a bloom phenomenon appears on the rubber surface upon allowing the rubber to stand after compounding.

For the purpose of solving these problems, there has been proposed the use of the so-called resorcinol resin as a formaldehyde-acceptor which is prepared by the condensation between resorcinol and formaldehyde. Further, as is known in Industrial and Engineering Chemistry, pp. 381 – 386 (1946), the resorcinol resin is often used in order to increase the adhesiveness between rubber and reinforcing materials and to improve the physical properties of rubber such as hardness and modulus.

Although the resorcinol resin is very excellent in its performance, it is disadvantageously so deliquescent in general that it adheres to packaging materials or forms a block and thereby is very troublesome in storage and handling.

As the result of an extensive study, it has now been found that a vulcanizable rubber composition comprising a cocondensate of formaldehyde, resorcinol and a phenol other than resorcinol such as m-cresol or p-cresol (hereinafter referred to as substituted phenol) can assure an excellent adhesiveness of rubber to reinforcing materials without any of the aforesaid defects.

The present invention provides a vulcanizable rubber composition comprising a rubber component, a formaldehyde-donor and a formaldehyde-acceptor, characterized in that the formaldehyde-acceptor is either a co-condensate of formaldehyde with a mixture of resorcinol and the substituted phenol, the weight ratio of resorcinol and the substituted phenol being preferably from 95/5 to 50/50, or a mixture of a condensate of resorcinol with formaldehyde (hereinafter referred to as resorcinol resin) and a condensate of the substituted phenol with formaldehyde (hereinafter referred to as substituted phenol resin), the weight ratio of the resorcinol resin and the substituted phenol resin being preferably from 95/5 to 50/50.

Examples of the substituted phenol include m-cresol, p-cresol, tert.-butylphenols, tert.-octylphenols, etc. The use of m-cresol or p-t-octylphenol is particularly favored.

In the preparation of the co-condensate of resorcinol-substituted phenol-formaldehyde, the molar ratio of formaldehyde and the phenols (i.e. resorcinol plus the substituted phenol) is usually 0.4 – 1.3 : 1, preferably 0.5 – 1.1 : 1, and the condensation may be carried out at a temperature of room temperature to 150°C. The weight ratio of resorcinol and the substituted phenol is preferably from 95 : 5 to 50 : 50.

When the proportion of the substituted phenol in these phenols exceeds 50 % by weight, the adhesion effect of the resulting acceptor is much decreased irrespective of the improvement in deliquescence and blocking, while the proportion of below 5 % by weight has only a little or no effect.

The addition of resorcinol and the substituted phenol may be carried out simultaneously or preferably in such an order that the substituted phenol is first added to react with formaldehyde and then resorcinol is added to complete the condensation. It is preferred to use a catalyst such as an acid or an alkali in order to accelerate the condensation. The resulting resorcinol-substituted phenol-formaldehyde co-condensate has a softening point of 60° to 130°C, preferably 80° to 110°C, as measured by the ring and ball method.

In the preparation of the resorcinol resin, the molar ratio of formaldehyde and resorcinol is 0.4 – 1.0 : 1, preferably 0.5 – 0.8 : 1, and the condensation may be carried out at a temperature of room temperature to 100°C. In the preparation of the substituted phenol resin, the molar ratio of formaldehyde and the substituted phenol is 0.5 – 1.4 : 1, preferably 0.6 – 1.2 : 1, and the reaction temperature is between room temperature and 150°C. Either of the above condensation reactions can be accelerated with a catalyst such as an acid or an alkali. As for the reaction conditions other than those as mentioned above, there may be adopted any conventional ones. The resorcinol resin and the substituted phenol resin thus separately prepared may be admixed together by any conventional manner. For example, admixture may be accomplished by mixing the two resins thorougly dried beforehand according to any conventional method, by mixing the resins uniformly in a molten state, or by mixing the two reaction products in a slurry form as they are. The weight ratio of the resorcinol resin and the substituted phenol resin is preferably from 95 : 5 to 50 : 50, for the same reasons as in the weight ratio of resorcinol and the substituted phenol as mentioned above.

The resorcinol-substituted phenol-formaldehyde co-condensate, the resorcinol resin and the substituted phenol resin are required to be thoroughly dried, before and after mixing, under atmospheric or reduced pressure.

When the resorcinol-substituted phenol-formaldehyde co-condensate and the resorcinol resin are respectively used in combination with the substituted phenol and the substituted phenol resin according to this invention, they assure a better adhesiveness between rubber and reinforcing materials and more enhanced physical properties of rubber without any deliquescence and blocking than those as attained when used alone. Thus, the formaldehyde-acceptor of the invention is very easy to handle, and the operation efficiency is much improved.

The formaldehyde-acceptor of the invention may be compounded into rubber usually in an amount of 0.5 to 10 PHR, preferably of 2 to 5 PHR. The term PHR referred to herein means parts by weight based on 100 parts by weight of rubber. As for other compounding conditions, the conditions used in a conventional compounding adhesion may be applied.

As the formaldehyde-donor, there may be used any conventional one (e.g. di- to hexa-methylolmelamines, completely or partially etherified or esterified derivatives thereof, hexamethylenetetramine) which has been employed together with a formaldehyde-acceptor (e.g. resorcinol or its condensate with formaldehyde, di- to tetra-methylolmelamine condensates containing 3 to 8 oligomers of methylmelamine). The formaldehyde-donor may be used usually in an amount of 0.1 to 10 parts by weight, preferably of 2 to 5 parts by weight per 100 parts of the rubber component.

The rubber component may be any of the natural and synthetic rubbers such as polybutadiene, polyisoprene, styrene-butadiene copolymer, butadiene-acrylonitrile copolymer, and their mixtures.

The vulcanizable rubber composition of the invention may contain, in addition to the said components, any other additive such as a vulcanizing agent, a reinforcing filler or the like.

The vulcanizable rubber composition may be formulated according to a conventional procedure, for example, by the use of a roll or Banbury mixer.

The reinforcing material may be natural fibers (e.g. cotton), synthetic fibers (e.g. nylon, vinylon, polyester), steel cords and the like. It may be pre-treated with any suitable adhesive such as RFL liquor, if necessary. In the case of steel cords, they may be pre-treated with suitable metals such as brass and zinc.

The adhesion with the vulcanizable rubber composition and the reinforcing materials as well as the vulcanization may be carried out in a conventional manner.

The present invention will be illustrated with reference to the following examples, which are only given for the purpose of illustration and are not to be interpreted as limiting.

EXAMPLE 1

In a 300 ml volume flask, 32.4 g (0.3 mole) of pure m-cresol, 48.6 g (0.6 mole) of 37 % formalin and 3 ml (0.03 mole) of 10N NaOH were charged, and the reaction was carried out at 70°C for 3 hours. Then, 77 g (0.7 mole) of resorcinol were added thereto, and the reaction was further carried out at 50°C for 3 hours. After completion of the reaction, water was distilled off at 120°C under a reduced pressure of 15 mmHg to give 119 g of the co-condensate resin (softening point, 92°C). The co-condensate resin thus obtained was formed into granules of about 2 - 3 cm in size and allowed to stand in a constant temperature vessel at 40°C under a humidity of 50 % for one month to examine the deliquescence and blocking.

The test results are shown in Table 1, from which it is seen that the co-condensate resin is much superior to "Bonding Agent R-6" (a registered trademark of the resorcinolformalin resin manufactured by Uniroyal Co., Ltd.) as a control.

Table 1

| Resin Time elapsed(day) | Co-condensate resin | Bonding Agent R-6 |
|---|---|---|
| 7 | no change | sticky (deliquescent) |
| 20 | a little or no change | blocking (sticky) |
| 30 | a little sticky | blocking (sticky) |

Rubber compositions as shown in Table 2 were formulated using the resins as shown in Table 1.

For the formulation of the rubber compositions, a Banbury mixer (capacity: 1.8 liters) having a casing temperature of 130° to 140°C was used. Raw rubber (SBR No. 1500) was charged in the mixer and pre-mixed for one minute. Then, HAF Black, a softening agent, an antioxidant (Antigene RD; a registered trademark of Sumitomo Chemical Company, Limited), stearic acid, sulfur and zinc oxide were added thereto in onehalf the amounts required and compounded into rubber for two minutes. Then, the other half of the ingredients were added and compounded for a further two minutes. Thereafter, the co-condensate resin or the said known resin, an accelerator (Soxinol DM/D; a registered trademark of Sumitomo Chemical Company, Limited) and a formaldehyde-donor (hexamethylenetetramine) were added and compounded for one minute and a half. The rubber compositions thus prepared were formed into sheets of required thickness between 10 inch rolls and tested as to the adhesiveness between rubber and RFL-treated cord (1260 d/2) according to the method disclosed in India Rubber World, Vol. 114, March, pp. 213 – 219 (1946). Further, the physical properties of the rubber were tested according to JIS K6301. The test pieces used for the adhesion test and the rubber property test were prepared by vulcanization at 150°C for 40 minutes. The test results are shown in Table 2 wherein the bond strength is an average of the values obtained with 18 test pieces.

Table 2

| Ingredients | Rubber composition No. | 1 | 2 | 3 | 4 |
|---|---|---|---|---|---|
| Rubber "SBR No. 1500" (manufactured by Sumitomo Chemical Company, Limited) | (PHR) | 100.0 | 100.0 | 100.0 | 100.0 |

Table 2-continued

| Ingredients \ Rubber composition No. | 1 | 2 | 3 | 4 |
|---|---|---|---|---|
| Stearic acid | 1.0 | 1.0 | 1.0 | 1.0 |
| Zinc oxide | 5.0 | 5.0 | 5.0 | 5.0 |
| HAF Black | 50.0 | 50.0 | 50.0 | 50.0 |
| Antioxidant "Antigene RD" | 2.0 | 2.0 | 2.0 | 2.0 |
| Accelerator "Soxinol DM" | 1.0 | 1.0 | 1.0 | 1.0 |
| Accelerator "Soxinol D" | 0.5 | 0.5 | 0.5 | 0.5 |
| Hexamethylenetetramine | 0.7 | 0.7 | 0.7 | — |
| Sulfur | 2.0 | 2.0 | 2.0 | 2.0 |
| Co-condensate resin | 2.0 | — | — | — |
| Resin | | | | |
| Bonding agent R-6 | — | 2.0 | — | — |
| Bond strength (H-test;Kg) | 17.2 | 17.0 | 15.0 | 14.5 |
| Tensile strength (Kg/cm²) | 260 | 250 | 240 | 238 |
| 300 % tension modulus (Kg/cm²) | 170 | 155 | 145 | 136 |
| Elongation (%) | 490 | 470 | 440 | 490 |
| Hardness (Hs) | 70 | 69 | 63 | 63 |

Note: Rubber composition No. 1, an embodiment of the invention; Rubber compositions Nos. 2 to 4, controls.

EXAMPLE 2

In a 500 ml volume flask, 110 g (1.0 mole) of resorcinol and 44.5 g of 37 % formalin were charged, and the reaction is carried out at 70°C for 5 hours. After the reaction was completed, water was distilled off at 150°C under 25 mmHg, to give 115 g of the resorcinol resin (softening point, 98°C).

Separately, 1,030 g of p-tert.-octylphenol, 250 g of toluene, 4 g of p-toluenesulfonic acid and 486 g of 37 % formalin were charged in a 2 liter volume flask, and the reaction was carried out at 92° – 135°C for 2 hours, during which 406 g of water were distilled off. After completion of the reaction, the reaction mixture was neutralized with 3 ml of 10N NaOH and concentrated at 130°C under 20 mmHg to recover 150 g of toluene, thus giving 1,075 g of the substituted phenol resin (softening point, 105°C).

The two resins thus obtained were mixed together uniformly in a 200 ml volume flask kept at 150°C on an oil bath in the proportions as shown in Table 3 (the resulting mixtures being referred to as resin compositions (A), (B) and (C)). The deliquescence of these compositions was tested in the same manner as in Example 1. The test results are shown in Table 3.

Table 3

| Components | Resin | Resin composition (A) | (B) | (C) | Control | Resorcinol resin |
|---|---|---|---|---|---|---|
| | | (PHR) | | | | |
| Resorcinol resin | | 90 | 75 | 50 | 25 | 100 |
| Substituted phenol resin (II) | | 10 | 25 | 50 | 75 | 0 |
| Time elapsed (day) | 7 | no change | no change | no change | no change | sticky (deliquescent) |
| | 20 | no change | no change | no change | no change | blocking |
| | 30 | a little sticky | a little sticky | a little or no change | no change | blocking |

The performances of the resin compositions (A), (B) and (C) as well as the resin composition for control were tested as to the adhesiveness between rubber and brass-plated steel tyre cord (7 × 4 × 0.007") according to ASTM-D-2229-68. The rate of pulling was 150 mm/min. The raw rubber used in the adhesion test was natural rubber (RSS No. 1), and the accelerator was Soxinol CZ (a registered trademark of Sumitomo Chemical Company, Limited). Further, the formaldehyde-donor was hexamethoxymethyl-melamine. The rubber compositions were each formed into a sheet and vulcanized at 140°C for 30 minutes. Then, the tensile property of the rubber was measured. The results are shown in Table 4.

Table 4

| Ingredients \ Rubber composition No. | 5 | 6 | 7 | 8 | 9 | 10 | 11 |
|---|---|---|---|---|---|---|---|
| Natural rubber "RSS No. 1" | (PHR) 100.0 | 100.0 | 100.0 | 100.0 | 100.0 | 100.0 | 100.0 |
| Stearic acid | 2.0 | 2.0 | 2.0 | 2.0 | 2.0 | 2.0 | 2.0 |
| Zinc oxide | 5.0 | 5.0 | 5.0 | 5.0 | 5.0 | 5.0 | 5.0 |
| Process oil | 4.0 | 4.0 | 4.0 | 4.0 | 4.0 | 4.0 | 4.0 |

Table 4-continued

| Ingredients | Rubber composition No. | 5 | 6 | 7 | 8 | 9 | 10 | 11 |
|---|---|---|---|---|---|---|---|---|
| HAF Black | | 45.0 | 45.0 | 45.0 | 45.0 | 45.0 | 45.0 | 45.0 |
| Antioxidant "Antigene RD" | | 2.0 | 2.0 | 2.0 | 2.0 | 2.0 | 2.0 | 2.0 |
| Accelerator "Soxinol CZ" | | 0.5 | 0.5 | 0.5 | 0.5 | 0.5 | 0.5 | 0.5 |
| Hexamethoxy-methylmelamine | | 1.0 | 1.0 | 1.0 | 1.0 | 1.0 | 1.0 | — |
| Sulfur | | 2.5 | 2.5 | 2.5 | 2.5 | 2.5 | 2.5 | 2.5 |
| Resin composition | (A) | 2.0 | | | | | | |
| | (B) | | 2.0 | | | | | |
| Resin | (C) | | | 2.0 | | | | |
| Control | | | | | 2.0 | | | |
| Resorcinol resin | | | | | | 2.0 | | |
| Bonding agent R-6 | | | | | | | 2.0 | |
| Bond strength (Kg) | | 143 | 145 | 143 | 118 | 140 | 140 | 100 |
| Tensile strength (Kg/cm²) | | 298 | 300 | 295 | 290 | 300 | 295 | 300 |
| 300 % tension modulus (Kg/cm²) | | 170 | 168 | 170 | 125 | 165 | 165 | 120 |
| Elongation (%) | | 590 | 590 | 580 | 580 | 590 | 580 | 550 |
| Hardness (Hs) | | 72 | 72 | 71 | 68 | 71 | 72 | 66 |

Note: Rubber compositions Nos. 5 to 7, embodiments of the invention; Rubber compositions Nos. 8 to 11, controls.

What is claimed is:

1. A vulcanizable rubber composition containing a rubber component, a formaldehyde-donor selected from the group consisting of di- to hexa-methylolmelamines, completely or partially etherified or esterified derivatives thereof and hexamethylenetetramine and a formaldehyde-acceptor, wherein the formaldehyde-acceptor is a co-condensate of formaldehyde with a mixture of resorcinol and a phenol selected from the group consisting of m-cresol, p-cresol, tertbutylphenols and tert-octylphenols, the molar ratio of formaldehyde and the mixture of resorcinol and the phenol being 0.4–1.3 : 1, and the weight ratio of resorcinol and the phenol being from 95:5 to 50:50, or a mixture of a condensate of resorcinol with formaldehyde and a condensate of the phenol with formaldehyde, the molar ratio of resorcinol and formaldehyde in the condensate of resorcinol with formaldehyde being 0.4–1.0 : 1, and the molar ratio of formaldehyde and the phenol in the condensate of the phenol with formaldehyde being 0.5–1.4 : 1, and the weight ratio of the condensate of resorcinol with formaldehyde and the condensate of the phenol with formaldehyde being from 95:5 to 50:50

2. The vulcanizable rubber composition according to claim 1, wherein the amount of the formaldehyde-acceptor is 1 to 10 parts by weight to 100 parts by weight of the rubber component.

3. The vulcanizable rubber composition according to claim 1, wherein the phenol is m-cresol.

4. The vulcanizable rubber composition according to claim 1, wherein the phenol is p-t-octylphenol.

5. The vulcanizable rubber composition according to claim 1, wherein the molar ratio of formaldehyde and the mixture of resorcinol and the phenol is 0.5–1.1 : 1

6. The vulcanizable rubber composition according to claim 1, wherein the molar ratio of resorcinol and formaldehyde in the condensate of resorcinol with formaldehyde is 0.5–0.8 : 1, and the molar ratio of formaldehyde and the phenol in the condensate of the phenol with formaldehyde is 0.6–1.2 : 1.

* * * * *